Figure 9:
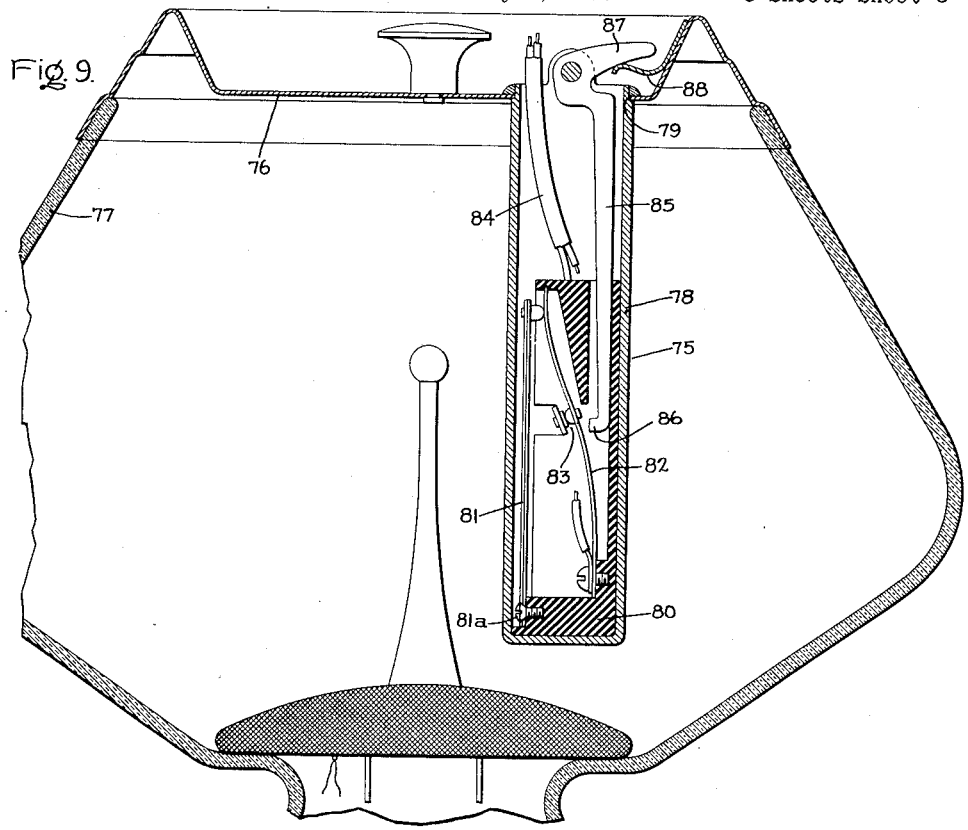

Aug. 1, 1939.  C. I. HALL  2,168,158
COFFEE MAKER
Filed July 3, 1936  3 Sheets-Sheet 1
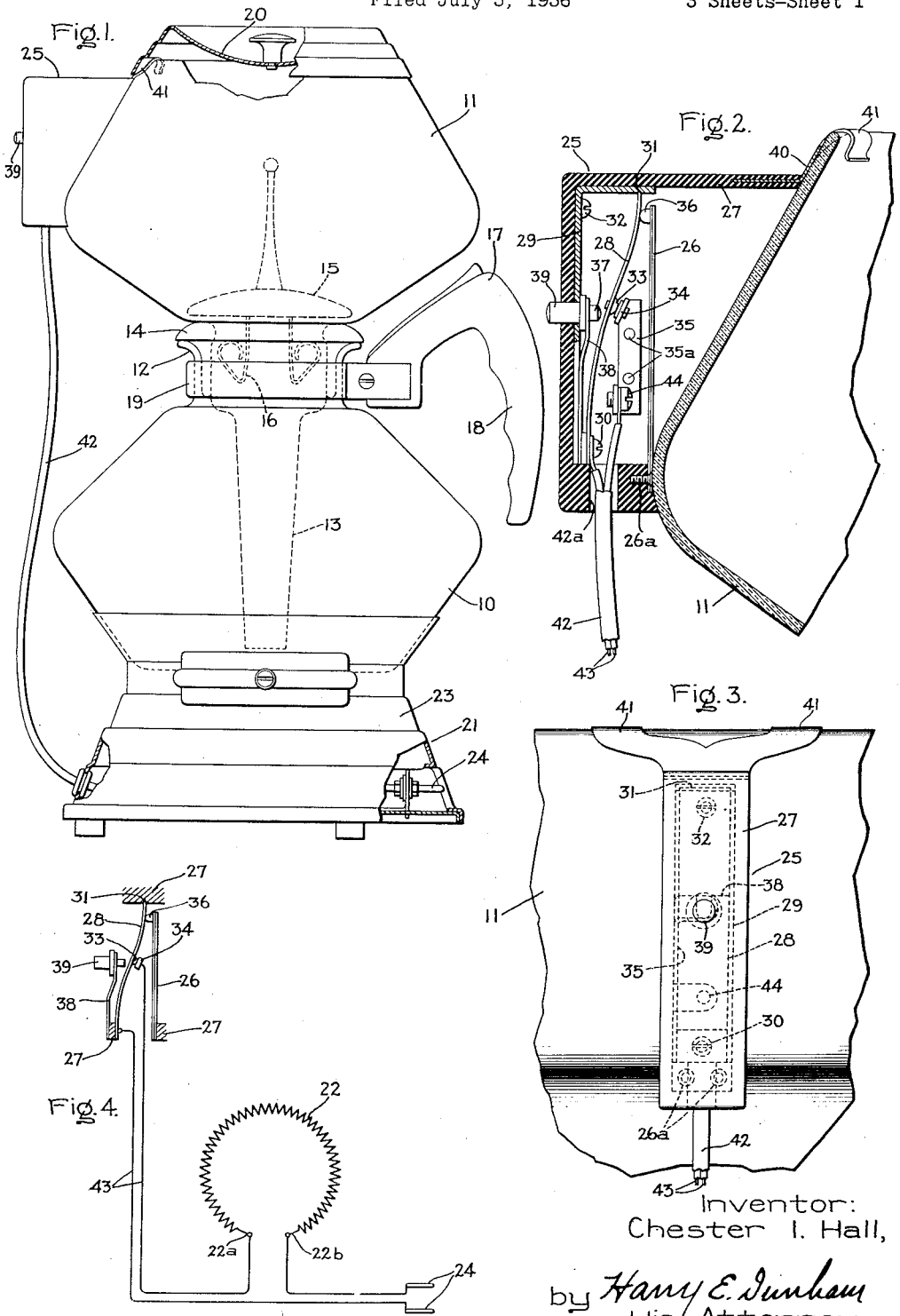
Inventor:
Chester I. Hall,
by Harry E. Dunham
His Attorney.

Aug. 1, 1939.  C. I. HALL  2,168,158
COFFEE MAKER
Filed July 3, 1936    3 Sheets-Sheet 2
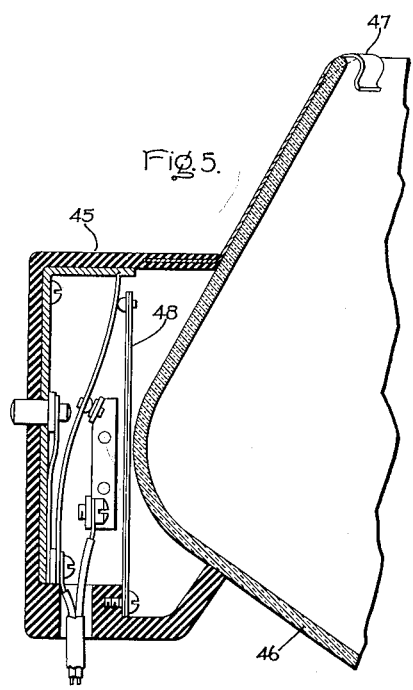
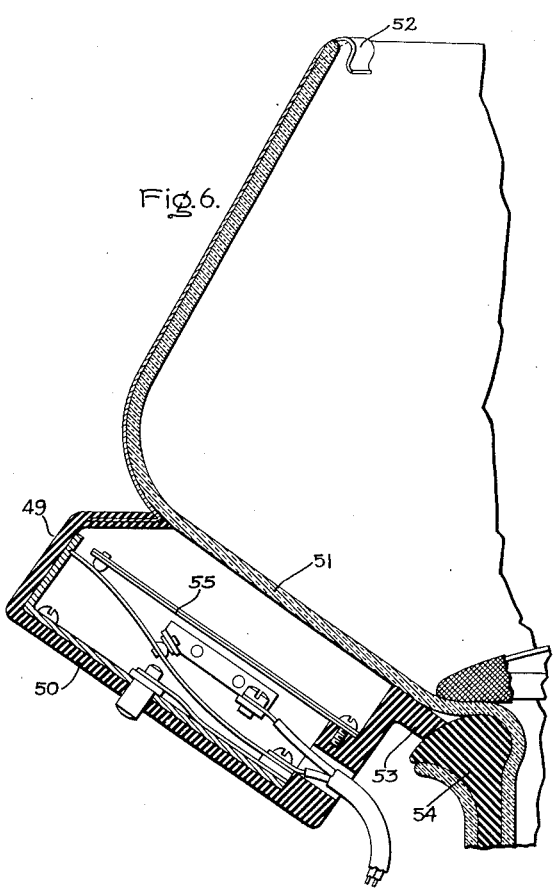
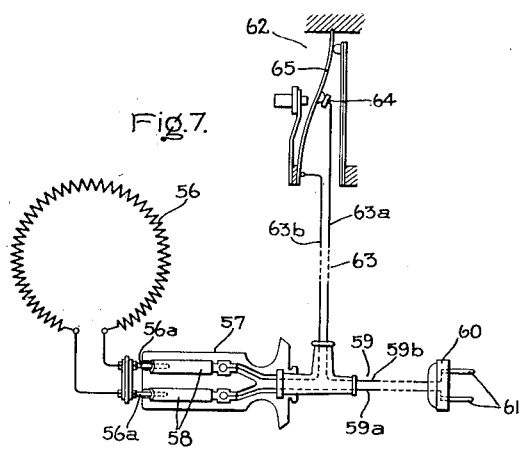
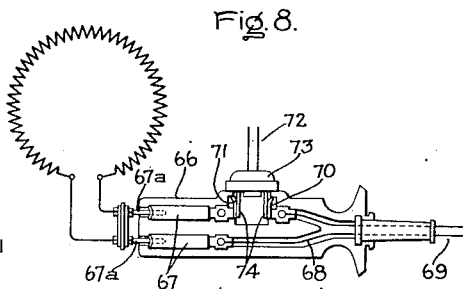
Inventor:
Chester I. Hall,
by Harry E. Dunham
His Attorney.

Aug. 1, 1939.　　　　C. I. HALL　　　　2,168,158
COFFEE MAKER
Filed July 3, 1936　　　3 Sheets-Sheet 3

Inventor:
Chester I. Hall,
by Harry E. Dunham
His Attorney.

Patented Aug. 1, 1939

2,168,158

UNITED STATES PATENT OFFICE 2,168,158

COFFEE MAKER

Chester I. Hall, Schenectady, N. Y., assignor to General Electric Company, a corporation of New York Application July 3, 1936, Serial No. 88,765

6 Claims. (Cl. 219—43)

This invention relates to coffee makers, and it has for its object the provision of an improved device of this character which is automatic in its operation.

More specifically, this invention relates to coffee makers of the vacuum type. These coffee makers are provided with coffee steeping and water heating vessels which are in liquid communication with each other. A suitable heating element is arranged to apply heat to the water in the water receptacle.

The coffee grounds are placed in the steeping receptacle, while a suitable quantity of water is placed in the water heating receptacle. When this water is heated sufficiently, it is transferred to the steeping receptacle where the coffee grounds are steeped or infused. The water is transferred from the water heating receptacle to the steeping receptacle by the pressure of the water vapor and air above the water level in the water receptacle that is generated when the water is heated. When the heat is removed from the water heating vessel, the water vapor in the vessel condenses and the pressure is thereby reduced sufficiently to cause the coffee infusion in the steeping vessel to return to the water heating vessel.

In coffee makers of this type, it is the usual practice to cut off the heat manually as soon as the water has been transferred to the steeping receptacle. This practice makes a good coffee brew providing that the maximum quantity of water for which the coffee making apparatus has been designed is used. If lesser quantities of water are used, it is found that the pressure generated above the water level in the water heating vessel attains a sufficient value to cause a transfer of the water to the steeping vessel before the water is sufficiently heated. This, of course, produces a poor brew. Moreover, if the initial temperature of the water placed in the water-heating vessel varies widely, the temperature of the brew will vary at the time the heat is cut off.

This invention has as one of its objects the provision of an improved control for the coffee maker rendering it completely automatic after the heat has been turned on to supply heat to the water in the water heating vessel.

Another object of this invention is the provision of improved control means for the coffee maker arranged to shut off the heat at the proper time, irrespective of the quantity of coffee that is being made; that is, irrespective of the quantity of water that is heated in the water-heating vessel, and also irrespective of the initial temperature of the water.

Another object of this invention is the provision of an improved temperature control that can be applied as an auxiliary attachment to vacuum coffee makers now on the market.

In accordance with this invention, a suitable thermostat for the heating means is provided arranged to shut off the heat responsively to the temperature of the coffee infusion in the steeping vessel. The temperature control is so arranged that it will shut off the heat only when the coffee infusion attains a predetermined maximum temperature. When the maximum quantity of coffee is being made, the temperature control device is adjusted to shut off the heat substantially at the time the coffee infusion reaches its maximum level in the upper bowl. In the event smaller quantities of coffee are being made, the temperature control device interposes a time lag between the time that the coffee infusion reaches its maximum level and the time the heating unit is shut off to permit the coffee infusion to be heated to the predetermined maximum.

Figure 10:
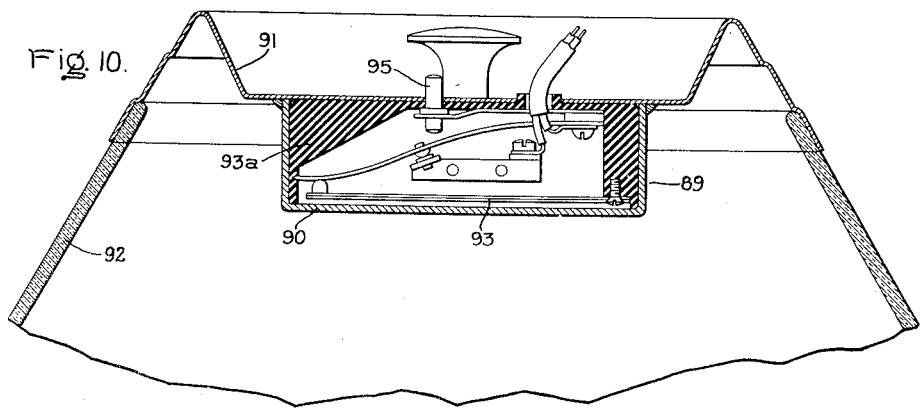

For a more complete understanding of this invention, reference should be had to the accompanying drawings in which Fig. 1 is a vertical elevation of a vacuum type coffee maker embodying this invention, parts being broken away so as to illustrate certain details of construction; Fig. 2 is an enlarged fragmentary view in section of a portion of the apparatus of Fig. 1; Fig. 3 is an end view of the portion of the apparatus shown in Fig. 2; Fig. 4 is a diagrammatic representation of heating means for the coffee maker of Figs. 1, 2 and 3 together with a temperature control device therefor arranged in accordance with this invention; Fig. 5 is a view similar to Fig. 2, but illustrating a temperature control device of modified form arranged in accordance with this invention; Fig. 6 is a view similar to Fig. 5 illustrating still another form of this invention; Fig. 7 is a diagrammatic view illustrating a plug arrangement for the temperature control whereby the temperature control can be applied to any existing suitable coffee maker of the vacuum type; Fig. 8 is a diagrammatic representation of still another plug arrangement for applying the temperature control; Fig. 9 is an enlarged fragmentary view in section illustrating still another form of this invention; and Fig. 10 is an enlarged sectional view of a further form of this invention.

Referring more particularly to Figs. 1–4, inclusive, this invention has been shown as applied to a coffee maker comprising a lower water heating vessel or bowl 10 and an upper coffee infusion or steeping vessel or bowl 11. The lower bowl 10 is provided at its upper portion with an upright neck 12 within which a depending tubular extension 13 attached to the lower portion of the upper bowl 11 is received. The extension 13 constitutes a liquid passageway placing the bowls 10 and 11 in liquid communication. A suitable gasket or stoppel 14, preferably formed of rubber, is inserted in the neck 12 of the lower bowl and is provided with a centrally arranged aperture to receive the extension 13 provided on the upper bowl.

Resting on the bottom wall of the upper bowl 11 directly above the opening into the extension 13 is a filter or strainer 15, resiliently secured in position by means of a spring 16.

A suitable handle 17 is attached to the lower bowl 10. As shown, this handle comprises a hand-grasping portion 18 and a portion 19 surrounding and gripping the neck 12 of the lower bowl.

The upper bowl 11 normally is covered by a suitable cover member 20.

A suitable electrical heating element 21 is positioned beneath the lower bowl 10 and is arranged to support the bowls 10 and 11 in their operative relation, as clearly shown in Fig. 1. The heating unit 21 comprises a suitable resistance conductor 22 (Fig. 4) mounted in a receptacle 23. The resistance conductor 22, at its ends, is provided with suitable terminal pins 24 which are arranged to receive the usual supply plug of an ordinary supply cord.

The parts of the apparatus thus far described are arranged substantially in accordance with the coffee maker described and claimed in the copending application of Walter R. Weeks, Serial No. 42,007, filed September 25, 1935, and which application is assigned to the same assignee as this application.

In the operation of the apparatus thus far described, it will be understood that coffee grounds will be placed in the infusion receptacle 11 above the filter 15, and that a suitable quantity of water will be placed in the lower bowl 10. Heat will then be applied by the heating element 21. The water vapor that is generated by the application of heat collects above the level of the water in the lower bowl 10, and the air above this level at the same time is heated. Eventually, the water vapor and heated air generate a pressure sufficiently great to cause the water in the lower bowl to be forced up through the tube 13 and through the filter 15 into the upper bowl 11 where the coffee grounds are placed. As long as heat is applied to the lower bowl the water will continue to flow up into the upper bowl until all of the water in the lower bowl above the level of the lower end of the tube 13 will be forced into the upper bowl. The water will remain in the upper bowl to infuse the coffee until the heat is removed to permit the lower bowl to cool. When this happens the water vapor in the lower bowl will condense and thereby reduce the pressure therein sufficiently to cause the coffee brew in the upper bowl to flow down into the lower bowl through the coffee grounds and the filter 15 by atmospheric pressure and gravity. After the coffee has been made, the upper bowl may be removed and the coffee brew poured from the lower bowl by means of the handle 17.

In accordance with this invention, suitable means are provided for shutting off the heating element to render the vacuum coffee maker automatic, and further, to cut off the heat only at the proper time so that the water used to make the coffee infusion will be heated substantially to the same desired temperature before the heat is cut off, irrespective of the quantity of coffee that is being made, and irrespective of the initial temperature of the water used.

In accordance with this invention, a suitable thermostatic device 25 is provided to control the heating resistance 22 responsively to the temperature of the steeping vessel. As shown more clearly in Figs. 2, 3, and 4, my temperature control device comprises a bimetallic thermostat bar 26 mounted in a suitable housing 27. The thermostat bar, as shown, is rigidly secured at one end to the housing by means of a screw fastening device 26a, while its other end is free to move laterally in response to changes in temperature. The thermostat bar operates a suitable spring 28 having a reverse curve form, as clearly shown in Figs. 2 and 4. The end of this spring corresponding to the fixed end of the thermostat bar 26 is rigidly secured to a metallic frame 29 by means of a screw 30, while its opposite end rests in a knife edge bearing 31 provided for it in the frame 29. The frame 29 is secured to the housing by means of the screw 30 and a screw 32. The spring 28 carries a switch contact 33 which co-operates with a fixed contact 34 mounted on a conducting strip 35 which is secured to the housing by rivets 35a. The contacts 33 and 34 will be connected in the energizing circuit of the heating element 22, as will be pointed out in greater detail hereinafter. The housing 27 will be made of a suitable electrically insulating material, such as a phenol condensation product.

As shown, the free end of the bimetal blade 26 carries a button 36 bearing on the spring 28 at a point adjacent the bearing 31. The spring is so arranged that when the force applied by the thermostat bar attains a predetermined maximum, the spring will snap through center to move the contact 33 from the fixed contact 34 thereby to open the switch. This open-circuit position of the spring is defined by a suitable stop 37. The stop 37 is attached to a spring 38, secured to the housing by the screw 30. The spring 38 biases the stop to its position shown in Fig. 2. The stop may be moved inwardly by a push button 39 also attached to the spring 38. When the spring 28 has been snapped through center by the thermostat, it will move against the stop 37 and will remain there until the button 39 is depressed, whereupon it will be snapped back to its circuit closing position. In other words, the temperature control device 25 constitutes a thermal cutout which will open the switch when the bimetal blade attains a predetermined maximum temperature, the switch remaining open until manually reset by depression of the button 39. The housing 27, as shown, is attached to the upper portion of the vessel 11 by means of a suitable metallic strip 40 secured to the housing and terminating at its upper end in a hook 41 which is caught over the upper edge or lip of the vessel. The strip 40 may be secured to the housing in any suitable manner, but preferably will be molded in the housing. If desired, the upper end of the member 40 may be provided with a pair of spaced hooks 41, as shown in Fig. 3.

The housing 27, as shown, is open on its side facing the adjacent exterior wall of the steeping vessel 11. It will be understood that the steeping vessel 11 may have any suitable contour and that the housing 27 will be given an appropriate shape to fit the side wall of the vessel. It is preferable, however, that the housing be substantially closed to the outside atmosphere, except at the side next to the steeping vessel which is open.

Moreover, in the form of the invention shown in Figs. 1–4, the housing is so arranged that it supports the fixed end of the bimetallic blade 26 in direct thermal relation with the bowl 11.

A suitable cord 42 is associated with the control device comprising a pair of conductors 43. One of these conductors, as shown, is electrically connected to the conducting strip 35 by means of a screw 44, while the other conductor is electrically connected to the snap spring 28 by means of the screw 30. The cord 42, as shown, enters the housing 27 through a suitable aperture 42a provided for it in the housing. As shown in Fig. 4, the conductor 43 which is connected to the fixed contact 34 is electrically connected to one end 22a of the resistance conductor 22, while the other conductor 43 is connected to one of the terminal pins 24. The opposite end 22b of the resistance conductor is connected to the other terminal pin 24. It will be clear in view of these connections that when the terminal pins 24 are connected to an electrical supply source, the resistance conductor 22 will be connected to this source through the switch contacts 33 and 34.

In the operation of the device, it will be understood that when the heater 21 is energized to make coffee by connection of the terminals 24 with the electrical supply source, the resistance conductor 22 will heat the water in the lower bowl 10 to a sufficiently high temperature to transfer it to the infusion bowl 11. The infusion in the bowl 11 will transfer heat to the bimetal blade 26 partly by conduction through the wall 11 to the fixed end of the blade in contact with the wall and also by radiation through the open side of the housing. This thermostat is set so that it will operate to open the switch contacts 33 and 34 when the temperature of the infusion attains a predetermined maximum, such for example as 190° F. When the maximum quantity of coffee is being made, the water in the lower bowl will be heated substantially to 212° F. before it is transferred to the upper bowl, but will have the desired temperature of about 190° F. when it attains its maximum liquid level in the other bowl due to the cooling action of the walls of the upper bowl, the coffee grounds, the filter, etc. which it engages in its passage to the upper bowl. Substantially at this temperature of 190° F., the thermostat 26 will open the switch contacts 33 and 34 to shut off the heat, whereupon the coffee infusion will return to the lower bowl as previously described. The switch contacts 33 and 34 will remain in the open-circuit position until reset by the push button 39.

In the event a smaller quantity of coffee is desired, a smaller quantity of water will be used. In this case, as previously described, the water in the lower bowl will be pumped into the steeping bowl at a relatively low temperature which will depend upon the quantity of water used. The thermostat 26, however, will not open the circuit when the water attains its maximum liquid level in the upper bowl, as before, but will permit the heat to remain on to generate steam from the residual quantity of water in the lower bowl. This steam will be pumped up through the tube 13 and the filter 15 and will bubble up through the infusion in the upper bowl, and thereby heat the infusion. This action will continue until the infusion has been heated substantially to 190° F., whereupon the temperature control device 25 will shut off the heat to permit the infusion to return to the lower bowl 10.

Moreover, the thermostat will maintain energization of the heating element in all cases, until the desired temperature in the brew is attained, regardless of the initial temperature of the water used.

Thus, irrespective of the quantity or temperature of water used, the coffee infusion in the bowl 11 will always be brought up to substantially the same maximum desired temperature before the heat is cut off.

In the form of the invention shown in Fig. 5, the temperature control device 45 is suspended at a somewhat lower level of the upper bowl 46 than in the first form. As shown, the housing 45 is suspended by a hook 47 at a level substantially midway of the height of the bowl. Moreover, in the form of Fig. 5, the housing 45 supports the thermal blade 48 out of direct contact with the walls of the bowl 46. In other words, in this form of the invention, the thermostat 48 is mounted so that it responds only to radiant energy transmitted to it from the bowl. Otherwise, this form of the invention is the same and operates in the same manner as the form just described.

In the form of the invention shown in Fig. 6, the temperature control device 49 is supported at a still lower level. As shown, the housing 50 of this control device is supported at the very lower end of the bowl 51. In this case, the housing 50 is supported by its hook member 52 and by an abutment 53 on the housing which rests directly on the stoppel 54 corresponding to the stoppel 14 of Fig. 1.

Here also, the housing 50 supports the temperature responsive blade 55 out of direct contact with the side walls of the vessel 51, whereby the blade responds only to radiant energy.

In Fig. 7 there is illustrated one means of readily applying the control device of this invention to any existing standard coffee maker, whereby it becomes an auxiliary attachment. As shown, the electric resistance unit 56, corresponding to the resistance element 22, is provided with a pair of terminal pins 56a. Arranged to be operated with these pins is a suitable supply plug 57 provided with a pair of contacts 58 adapted to receive the pins. A supply cord 59 provided with a terminal plug 60 is secured to the plug 57. The plug 60, as shown, is provided with a pair of terminal pins 61 adapted to be applied to any suitable well-known supply receptacle.

One of the conductors 59a of the cord 59 connects one of the contacts 58 with one of the terminal pins 61, as shown. The other conductor 59b is connected with a conductor 63a of a cord 63 interconnecting the temperature control device 62 with the plug 57. The other conductor 63b of the cord 63 is connected with the other connector 58. The conductors 63a and 63b are also also connected respectively with the fixed contact 64 and the snap spring 65 of the control device 62, as shown.

The control device 62 is of substantially the same construction as those previously described. It will be understood that the plug 57, the plug 60 and the temperature control device 62, together with their cords 59 and 63, as shown in Fig. 7, may be used as a separate auxiliary attachment for coffee makers, and may be applied to any suitable vacuum coffee maker now on the market. To apply the control device, it is merely necessary to apply the plug 57 to the terminals of the coffee maker and then suspend the temperature control device 62 in any of the manners previously described on the upper bowl of the coffee maker.

In Fig. 8, there is illustrated another form of plug connection for my control device. In this form, a plug 66 is provided with a pair of contacts 67 for the terminal pins 67a of the coffee maker. A conductor 68 is attached to one of the connector members 67 and is directed through a suitable cord 69 to a connector plug similar to the plug 60 of Fig. 7. The other conductor of the cord 69 is connected to a contact 70 in the plug member 66. A mating contact member 71 is connected to the other contactor 67 of the plug. The contacts 70 and 71 function to connect electrically the temperature control device in the circuit of the heater. For this purpose, a suitable cord 72 similar to the cord 63 is provided. The cord 72 has a plug 73 at its lower end having terminal pins 74 arranged to be inserted in the plug 66 so as to engage the contacts 70 and 71.

In Fig. 9, there is illustrated still another form of this invention wherein the temperature control device is actually immersed in the coffee infusion in the upper bowl and responds chiefly to the heat conducted to it from the infusion. As shown in Fig. 9, the temperature control device 75 is mounted in the cover 76 of the upper bowl 77 so that when the cover is in its normal operative position, the temperature control device is immersed in the coffee liquid in the upper bowl. As shown, the temperature control device comprises an elongated metallic housing 78 mounted in an aperture 79 provided for it in the cover 76 so as to depend downwardly therefrom. Mounted within the lower end portion of the housing is a suitable electrically insulating supporting block 80 upon which is mounted a bimetallic bar 81. As shown, the lower end of the bar, as viewed in Fig. 9, is rigidly secured to the block 80 by means of a screw 81a, the bar extending upwardly in the housing relatively close to a side wall thereof. Also mounted on the block 80 is a snap spring 82 operating a switch 83 mounted on the block 80. The thermostat operates the switch in the manner previously described in connection with the other forms of this invention.

The housing 78 will be formed of a metal having a good conductivity so that heat which is imparted to it directly by the coffee infusion will be conducted through it to the temperature control blade 81.

The temperature control device is electrically connected to the heating circuit of the coffee maker by means of a cord 84 passed outwardly through the upper end of the housing 75, as shown.

A suitable manually operated latch 85 is pivotally mounted at its upper end in the upper end of the housing, and is provided at its lower end with an abutment 86 adapted when the handle 87 of the latch is depressed to engage the switch arm to throw it from its open-circuit to its closed circuit position. The latch is normally biased to its position shown in Fig. 9 by means of a spring 88.

In the form of the invention shown in Fig. 10, the temperature control device is supported so that it responds to the temperature of the vapor in the upper bowl above the level of the coffee infusion.

As shown, the temperature control device 89 of this form comprises an elongated metallic housing 90 arranged transversely of the cover 91 of the upper bowl 92 immediately below the lower surface of the cover and secured to it in any suitable manner. In this form, the bimetallic bar 93 is supported on an electrically insulating block 93a so as to lie substantially parallel with and relatively close to the bottom wall of the metallic housing 90. Thus, the temperature control device responds directly to the temperature of the housing which in turn is supported so that it responds to the vapor above the liquid level in the upper bowl. In this case, the reset button 95 is directed upwardly through an aperture provided for it in the cover 91, as clearly shown in Fig. 10.

It will be understood that any of the temperature control devices of Figs. 1, 2, 5, 6, 9, and 10 may be permanently connected with the coffee maker, as is the thermostat shown in Figs. 1 and 4, or may be detachably connected to the coffee maker, as shown in Figs. 7 and 8.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A coffee maker comprising a water heating vessel, a coffee steeping vessel in liquid communication with said water heating vessel, means for heating water in said heating vessel to transfer it to said steeping vessel, and a thermostat arranged to be suspended on the outer wall of said steeping vessel so as to be removed physically from contact with the infusion in the steeping vessel and so that it responds to heat energy transmitted from the infusion through the wall of said steeping vessel, and means operated by said thermostat for deenergizing said heating means when said thermostat attains a predetermined high temperature.

2. A coffee maker of the vacuum type comprising upper and lower coffee steeping and water heating bowls in liquid communication, a heating element under said lower bowl to heat the water therein sufficiently to transfer it to said infusion bowl, a bimetallic thermostatic strip controlling said heating element, a housing for said thermostatic strip substantially enclosed on all sides but one, and means for suspending said housing on the outside of said steeping bowl with said open side facing the exterior wall of said bowl.

3. A coffee maker of the vacuum type comprising upper and lower coffee steeping and water heating bowls in liquid communication, a heating element under said lower bowl to heat the water therein sufficiently to transfer it to said infusion bowl, a thermostat controlling said heating element, a housing for said thermostat substantially enclosed on all sides but one, and a strip attached to said housing and terminating in a hook adapted to be caught over the upper edge of one of said bowls to suspend said housing on said bowl with said open side facing said bowl.

4. A coffee maker of the vacuum type comprising upper and lower coffee steeping and water heating bowls in liquid communication, a heating element under said lower bowl to heat the water therein sufficiently to transfer it to said infusion bowl, a housing having an open side, a thermostatic blade in said housing having one end fixed to said housing adjacent said open side, a controlling switch for said heating element operated by the other end of said blade and means for suspending said housing on a wall of said upper bowl with said open side facing said wall and with said fixed end of said thermostatic blade in direct thermal relation with said bowl.

5. A coffee maker of the vacuum type comprising a lower water heating bowl having an upright neck, an upper coffee steeping bowl, a tube on said upper bowl directed through said neck connecting said bowls, a stopple around said tube and received in said neck, a heating element under said lower bowl to heat the water therein sufficiently to transfer it to said infusion bowl, a thermostat controlling said heating element, a housing for said thermostat, and means for suspending said housing on the outside of said upper bowl comprising a hook member attached to said housing and caught over the lip of said bowl and an abutment on said housing resting in said stopple.

6. A coffee maker comprising a water heating vessel, a coffee steeping vessel in liquid communication with said water heating vessel, means for heating the water in said heating vessel to transfer it into said steeping vessel, terminals for said heating element and an auxiliary attachment controlling said heating means comprising a temperature responsive element, a support for said element arranged to place it in thermal relation with one of said vessels, a control switch for said heating means operated by said temperature responsive element, an electric cord having conductors forming a circuit through said switch, terminal pins attached to said cord and connected with said conductors, an electric supply plug adapted to be attached to said terminals of said heating means and connected to an electrical supply cord and electrical contacts in said plug arranged to receive said terminal pins in said cord to connect said switch between said supply source and heating means, said terminal pins and cord being removable as a unit from said plug.

CHESTER I. HALL.